United States Patent
Sun

(10) Patent No.: US 11,500,644 B2
(45) Date of Patent: Nov. 15, 2022

(54) CUSTOM INSTRUCTION IMPLEMENTED FINITE STATE MACHINE ENGINES FOR EXTENSIBLE PROCESSORS

(71) Applicant: Alibaba Group Holding Limited, Grand Cayman (KY)

(72) Inventor: Fei Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/875,845

(22) Filed: May 15, 2020

(65) Prior Publication Data

US 2021/0357232 A1 Nov. 18, 2021

(51) Int. Cl.
*G06F 9/30* (2018.01)
*G06F 9/38* (2018.01)

(52) U.S. Cl.
CPC ................................. *G06F 9/3867* (2013.01)

(58) Field of Classification Search
CPC .................................................. G06F 9/3867
See application file for complete search history.

(56) References Cited

U.S. PATENT DOCUMENTS

| | | | | |
|---|---|---|---|---|
| 6,477,683 B1 * | 11/2002 | Killian | ...................... | G06F 8/41 |
| | | | | 716/106 |
| 7,010,558 B2 * | 3/2006 | Morris | ................ | G06F 9/30036 |
| | | | | 708/409 |
| 7,155,602 B2 * | 12/2006 | Poznanovic | .......... | G06F 9/3897 |
| | | | | 712/E9.067 |
| 8,578,097 B2 | 11/2013 | Kim et al. | | |
| 8,966,223 B2 * | 2/2015 | Knowles | ............... | G06F 9/3885 |
| | | | | 712/15 |
| 9,170,812 B2 * | 10/2015 | Vorbach | .............. | G06F 12/0875 |
| 2003/0018597 A1 | 1/2003 | Shetty | | |
| 2005/0216700 A1 * | 9/2005 | Honary | ............. | G06F 15/17393 |
| | | | | 712/15 |
| 2007/0198621 A1 | 8/2007 | Lumsdaine et al. | | |
| 2014/0279727 A1 | 9/2014 | Baraniuk et al. | | |
| 2016/0309105 A1 | 10/2016 | Dierickx et al. | | |
| 2016/0358075 A1 | 12/2016 | Zhang et al. | | |

(Continued)

OTHER PUBLICATIONS

AFPGA IP Completes Wireless-Backhaul Method, CM/SIGDA E-Newsletter, Sep. 1, 2008, vol. 38, No. 17, pp. 4-6.

(Continued)

*Primary Examiner* — Cheng Yuan Tseng

(57) ABSTRACT

An extensible processor can include an execution pipeline, one or more extensible control engines and architectural visible control states. The extensible processor can be configured to determine a control state of the one or more extensible control engines from the architectural visible control states. The extensible processor can be further configured to initiate execution of a given one of the extensible control engines when a control state in the architectural visible control states corresponding to the given one of the extensible control engines is enabled, wherein the given one of the extensible control engines comprises control input and control outputs based on one or more control transitions of an instruction. The extensible processor can also be further configured to output a result of execution of the given one of the extensible control engines to the architectural visible control states.

21 Claims, 9 Drawing Sheets

(56) References Cited

U.S. PATENT DOCUMENTS

| | | |
|---|---|---|
| 2016/0378442 A1 | 12/2016 | Rong et al. |
| 2017/0357889 A1 | 12/2017 | Zhang et al. |
| 2018/0046895 A1 | 2/2018 | Xie et al. |
| 2018/0157969 A1 | 6/2018 | Xie et al. |
| 2018/0174028 A1 | 6/2018 | Lin et al. |
| 2018/0309451 A1 | 10/2018 | Lu et al. |
| 2018/0345650 A1 | 12/2018 | Chisena et al. |
| 2018/0349764 A1 | 12/2018 | Zhang et al. |
| 2019/0065150 A1 | 2/2019 | Heddes |
| 2019/0095787 A1 | 3/2019 | Kung et al. |
| 2019/0108436 A1 | 4/2019 | David et al. |
| 2019/0146497 A1 | 5/2019 | Urtasun et al. |
| 2019/0156206 A1 | 5/2019 | Graham et al. |
| 2019/0158097 A1 | 5/2019 | Lu et al. |
| 2019/0278600 A1 | 9/2019 | Frumkin et al. |
| 2019/0347536 A1 | 11/2019 | David et al. |
| 2019/0362809 A1 | 11/2019 | Okimoto et al. |
| 2020/0051203 A1 | 2/2020 | Nurvitadhi et al. |
| 2020/0082254 A1 | 3/2020 | Dally et al. |
| 2020/0151571 A1 | 5/2020 | Wu |

OTHER PUBLICATIONS

Pittman, Richard et al., eMIPS, A Dynamically Extensible Processor, Technical Report MSR-TR-2006-0143, Oct. 2006, pp. 1-28.

Getman, Larry, Creating the Xilinx ZYNQ-7000 Extensible Processing Platform, EE Times, Oct. 17, 2011, pp. 1-3.

XTENSA LX7 Processor, High-Performance, Configurable and Extensible Controllers and DSPs, Cadence, Tensilica Datasheet, 2016, pp. 1-13.

Moyer, Bryon, How Does Scatter/Gather Work? Promises of Single-Cycle Access Are True, But . . . , EE Journal, Feb. 9, 2017, pp. 1-7.

He, Bingsheng et al., Efficient Gather Scatter Operations on Graphics Processors, SC07 Nov. 10-16, 2007, pp. 1-12.

Lukarski, Dimitar, Sparse Matrix-Vector Multiplication and Matrix Formats, Uppsala Universitet, Apr. 11, 2013, pp. 1-57.

He, Guixia et al., A Novel CSR-Based Sparse Matrix-Vector Multiplication on GPUs, Hindawi Publishing Corporation, vol. 2016, Mar. 27, 2016, pp. 1-13.

* cited by examiner

CUSTOM INSTRUCTION IMPLEMENTED FINITE STATE MACHINE ENGINES FOR EXTENSIBLE PROCESSORS

BACKGROUND OF THE INVENTION

Processors can include fixed: instruction set architecture (ISA) processors, application-specific instruction set processors (ASIPs), and extensible processors. Fixed ISA processors include x86-class processors, reduced instruction set computer (RISC) processors, advanced RISC machine (ARM) processors microprocessor without interlocked pipeline stages (MIPS), PowerPC processors and the like. The fixed ISA processors are general purpose processors that try to include instructions necessary to cover the largest space of potential applications in view of size, cost, power and other similar factors. However, a general-purpose fixed ISA processor is typically inefficient and underutilized because most applications do not use the large set of capabilities.

ASIPs are typically characterized by application-oriented structural parameters and specialized instruction sets for optimized performance for a particular application. ASIPs have been used in audio and video application to achieve power consumption reductions by a factor of three or more. ASIPs can therefore advantageously be utilized in battery powered devices and the like. However, the structural hardware parameters and specialized instructions are generally designed specifically for a given ASIP. The design of ASIP, including assemblers, linkers, compilers, instruction set simulators and the like can be very time consuming and costly. ASIP can also have a limited market, as compared to general-purpose fixed ISA processors, because they are designed and optimized for a particular application.

Extensible processors are typically characterized by configuring and extending a base instruction set architecture with a set of structural parameters drawn from a configuration space, and with a set of instruction extensions based on an extension space. A portion of the instruction set architecture, including specialized instructions, can be described in a processor description language, such as an architectural description language (ADL). The ADL can be utilized to create the hardware and software representations utilizing a set of custom tools such as assemblers, compilers, disassemblers and debuggers, and tool chain, with defined extension mechanisms that can link in dynamically complied libraries that reflect the syntax, and semantics of the set of instruction extensions produced by an ADL compiler. Extensible processors can provide for configuration of the number and kinds of local and system memory interfaces, the inclusion or exclusion of certain arithmetic logic units (ALUs), bit width customization, configuration of the sizes of register files, diagnostic and tracing capabilities, use of very long instruction word style multi-operation instructions, interrupt and exception handling, direct buffer interfaces, multiple load-store, pipeline sizing, and/or the like. ADLs can also be used to define specialized extension instructions tuned to specific applications and code requirements. Configurations can range from none, just a few or many hundreds of instructions, including complex multi-cycle instructions designed to speed up computations for particular algorithms while reducing power consumption through precise timing of instruction characteristics of the specific source code. Extensible processors combine the benefit of a general-purpose multi-user fixed ISA processor and ASIPs. Extensible processors can be configured for numerous specific applications. Furthermore, extensible processor can evolve with changes in a target market.

Referring to FIG. 1, an exemplary extensible processor according to the conventional art is shown. The extensible processor 100 can include one or more standard function blocks 110 with one or more configurable options 120, one or more configurable function blocks 130, one or more optional function blocks 140, one or more definable function blocks 150 and one or more communication interfaces 160. The one or more standard function blocks 110 can include, but are not limited to, processor controls, exception support units, exception handling registers, instruction fetch/decode unit, base ISA execution pipeline, and base arithmetic logic units. The configurable options 120 for the standard unction blocks 120 can include, but are not limited to, watch registers, times, interrupt controls, and extension pipelines. The configurable blocks 130 can include, but are not limited to, instruction memory management and error protection units, data memory management and error protection units, external communication interface units, and data load/store units. The optional function blocks 140 can include, but are not limited to, digital signal processors (DSPs), and communication interfaces. The definable function blocks 150 enable designers to add features to the extensible processor 100. One or more external defined function unit 170 can also be coupled to the extensible processor 100 by one or more communication interfaces 160. The definable function blocks 150, and optionally the one or mor external defined function units 170, can reduce processor cost, reduce processor power consumption, increase application performance and the like.

The definable function blocks 150, and optionally the one or mor external defined function units 170, can be easily added to an extensible processor 100. However, software instruction streams are needed to initiate the definable function blocks 150. For definable function blocks 150, and optionally the one or mor external defined function units 170, implementing software instruction streams for initiating definable function blocks 150 and external function units 170 can be a significant portion of the design process. Accordingly, there is a continuing need for extensible function blocks 150, and optionally the one or mor external defined function units 170, that do not require initiation by a software instruction stream.

SUMMARY OF THE INVENTION

The present technology may best be understood by referring to the following description and accompanying drawings that are used to illustrate embodiments of the present technology directed toward custom instruction implemented control logic engines or finite state machine engines for extensible processors.

In one embodiment, a method of configuring an extensible processor can include designing a function block including one or more data paths and ono or more control transitions of an instruction. An extensible control engine can be generated with control states as control inputs and control outputs based on the one more data paths and the one or more control transitions. A definable function block of the extensible processor can be configured based on the extensible control engine.

In another embodiment, an extensible control engine can be generated with control states as control inputs and control outputs based on the one or more control transitions. A hardware block external to the extensible processor, and coupled to the extensible control engine, can be generated based on the one or more data paths.

In another embodiment, operation of an extensible processor can include determining a control state for an extensible control engine. The extensible control engine can be executed when the control state is enabled. The extensible control engine can include control inputs and control output based on or more control transitions of an instruction. The extensible control engine can also include a data path of the instruction. Alternatively, a hardware block external to the extensible processor, and coupled to the extensible control engine can include the data path of the instruction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

Figure 1:
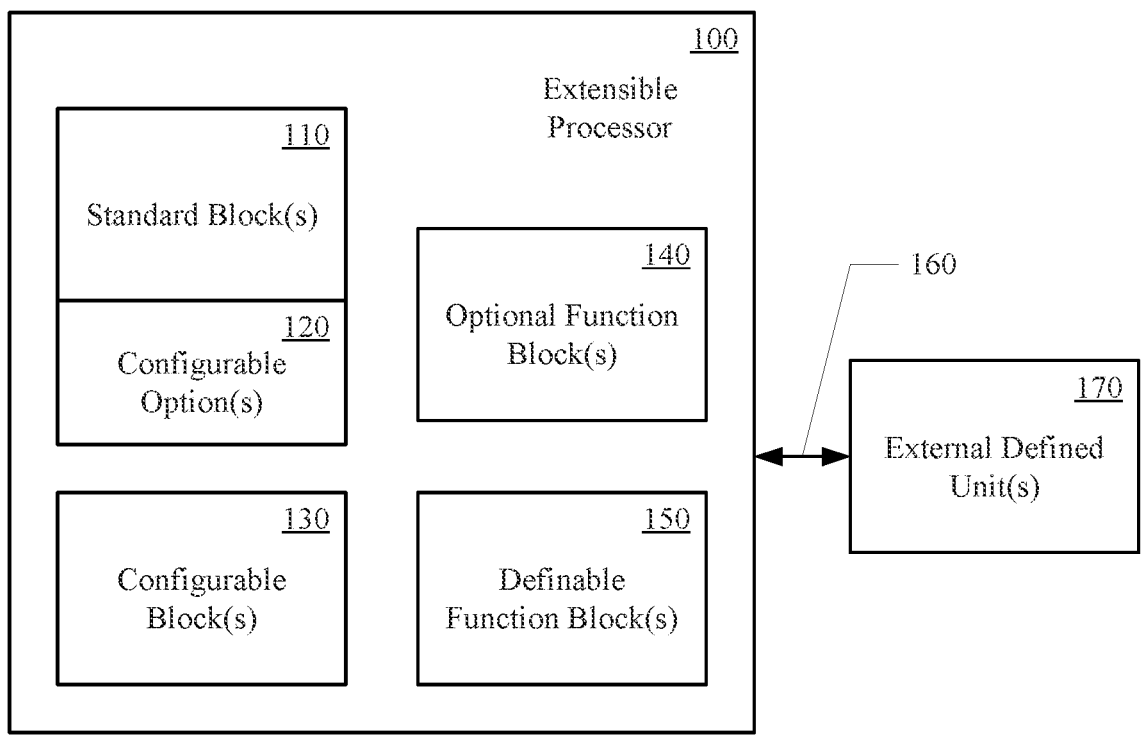
FIG. 1 shows an exemplary extensible processor according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other, instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises,""comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 2:
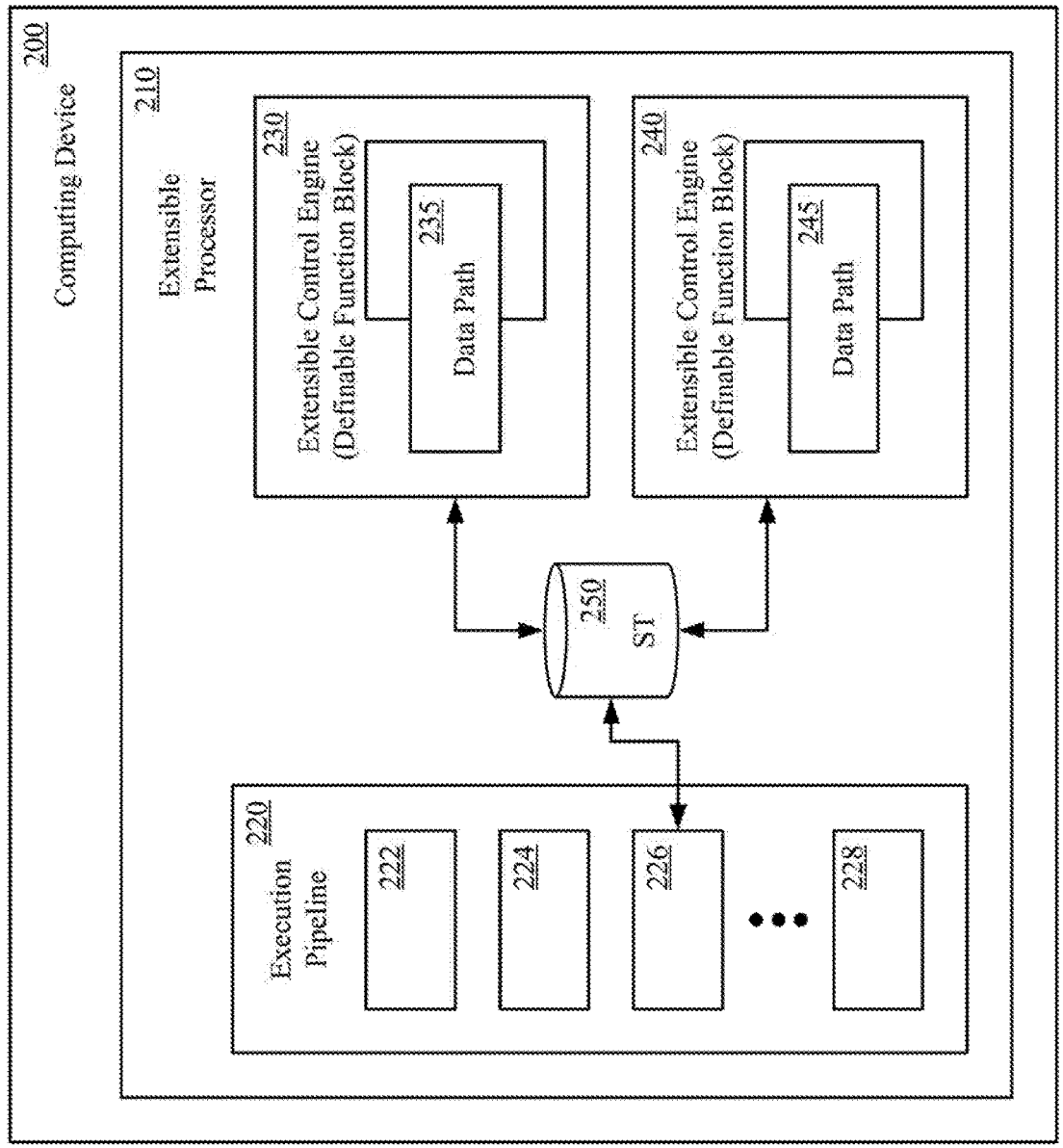
FIG. 2 shows a computing device including an extensible processor, in accordance with aspects of the present technology.

Referring now to FIG. 2, a computing device including an extensible processor, in accordance with aspects of the present technology, is shown. The computing device 200 can be, but is not limited to, cloud computing platforms, edge computing devices, servers, workstations, personal computers (PCs). The extensible processor 210 can include one or more standard function blocks with one or more configurable options, one or more configurable function blocks, one or more optional function blocks, one or more definable function blocks and one or more communication interfaces, as described above with respect to FIG. 1. The extensible processor 210 can implement a central processing unit (CPU), graphics processing unit (GPU), general-purpose computing on graphics processing unit (GPGPU), internet of things (IOT) CPU, tensor processing unit (TPU), digital signal processor (DSP), or any other such processor.

Figure 3:
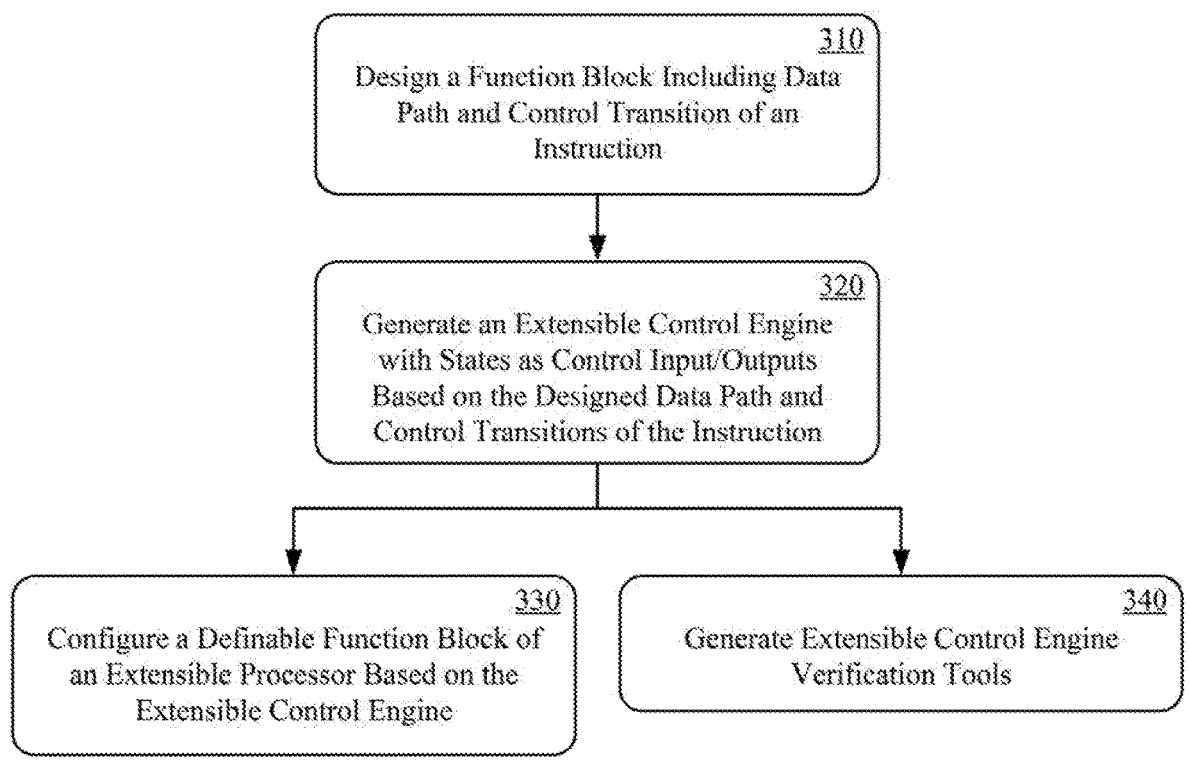
FIG. 3 shows a method of configuring an extensible processor, in accordance with aspects of the present technology.

The extensible processor 210 will now be further described with reference to FIG. 3, which shows a method of configuring the extensible processor 210 in accordance with aspects of the present technology. The configuration method may be implemented as computing device-executable instructions (e.g., computer program) that are stored in one or more computing device-readable media (e.g., computer memory) and executed by one or more computing devices (e.g., processors). In one implementation, the configuration method can be implemented in an integrated development environment (IDE) for the extensible processor 210.

Configuring the extensible processor 210 can include designing one or more function blocks including data path and control transitions of one or more instructions, at 310. At 320, one or more extensible control engines 230, 240 with states as control inputs and outputs can be generated based on the designed data path and control transitions of the one or more instructions. In one implementation, the control states of the one or more extensible control engines 230, 240 can be coupled to core states of the extensible processor 210. The control state of extensible control engines 230, 240 can be coupled to the same core state or different core states depending upon the respective instruction. In one implementation, one instruction can serve as one finite state machine (FSM). In another implementation, a plurality of instructions can serve as a FSM, with each instruction serving as a corresponding state in the FSM.

At 330, one or more definable function blocks of the extensible processor 210 can be configured based on the one or more generated extensible control engines 230, 240. In such an implementation, the data path 235 of an instruction can be part of the extensible control engine 230 within the extensible processor 210.

In one implementation, the control input and outputs of the extensible control engine 230 can be implemented as architectural visible control states 250 of the extensible processor 210. In one implementation, the architectural, visible control states 250 can be specific to a given extensible control engine 230. Architectural visible control states 250 can also be shared between extensible control engines 230, 240. In one implementation, data states can also be passed between the extensible processor 210 and an extensible control engine 230 by architectural visible control states 250. in another implementation, data states can be passed between multiple extensible control engines 230, 240 by architectural visible control states 250. in one implementation, an extensible control engine 230 is tied to a specific pipeline stage 226 of the extensible processor 210.

In one implementation, the extensible control engines 230, 240 can execute very cycle once enabled. In one implementation, execution of a given extensible control engine 230 can be enabled and disabled via one or more architectural visible control states 250 of the extensible processor 210. For example, a control state can include one bit that indicates whether the extensible control engine 230 is enabled or disabled. In an optional implementation, a specified state can indicate that an instruction result of the respective extensible control engine 230 is ready. When the specified state indicates that the result is not ready, dependent instructions can be stalled. For example, one of the control states 250 can include two-bits, one hit can indicate whether the given extensible control engine 230 is enabled or disabled, and a second hit can indicate whether a result of the given extensible control engine 230 is ready or not. In one implementation, the instruction of the extensible control engine 230 does not appear in a software instruction steam of the extensible processor 210. In one implementation, the extensible control engine 230 can be clock gated, which can reduce power consumption when the extensible control engine is not enabled.

Figure 4:
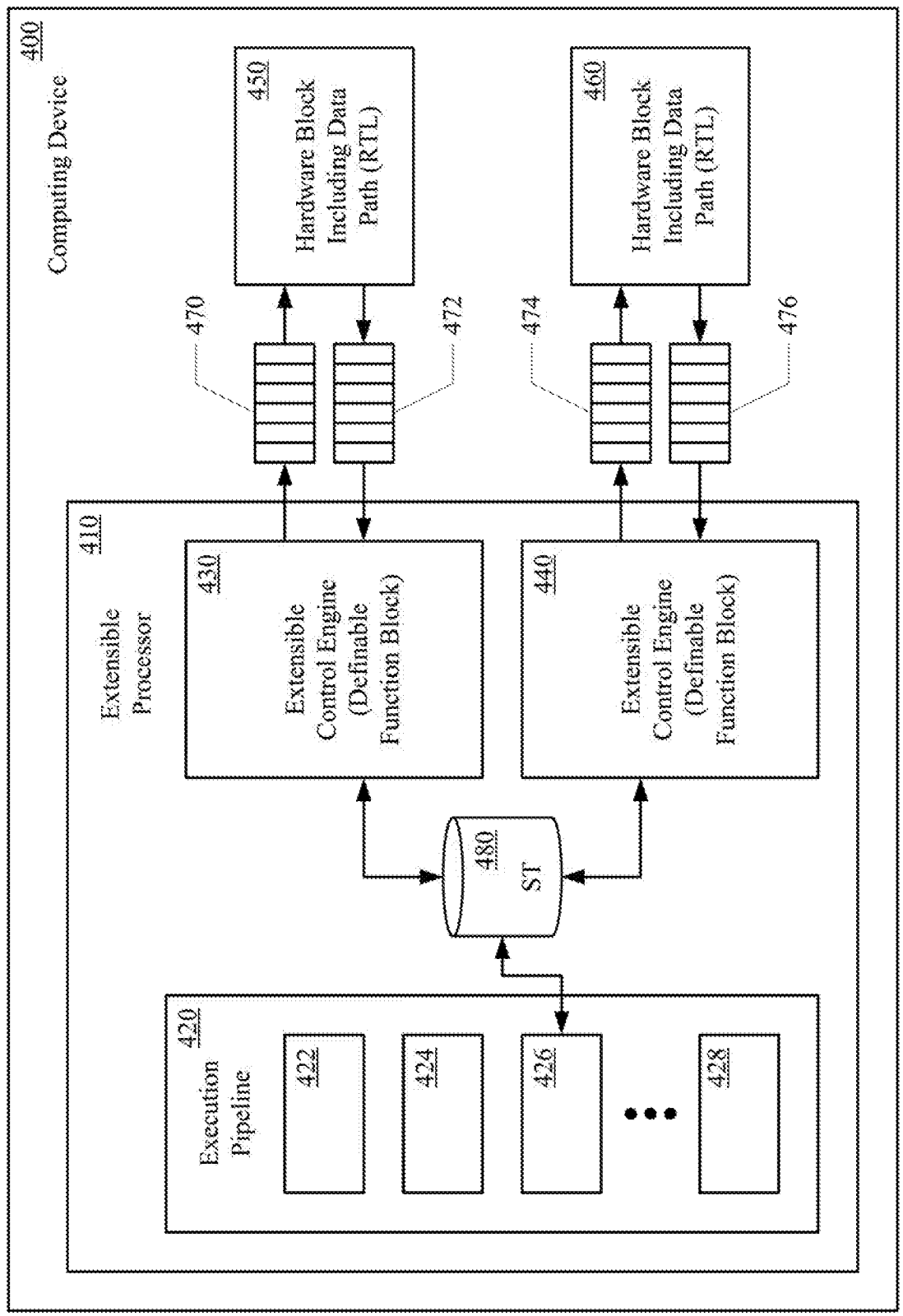
FIG. 4 shows a computing device including an extensible processor, in accordance with aspects of the present technology.
Figure 5:
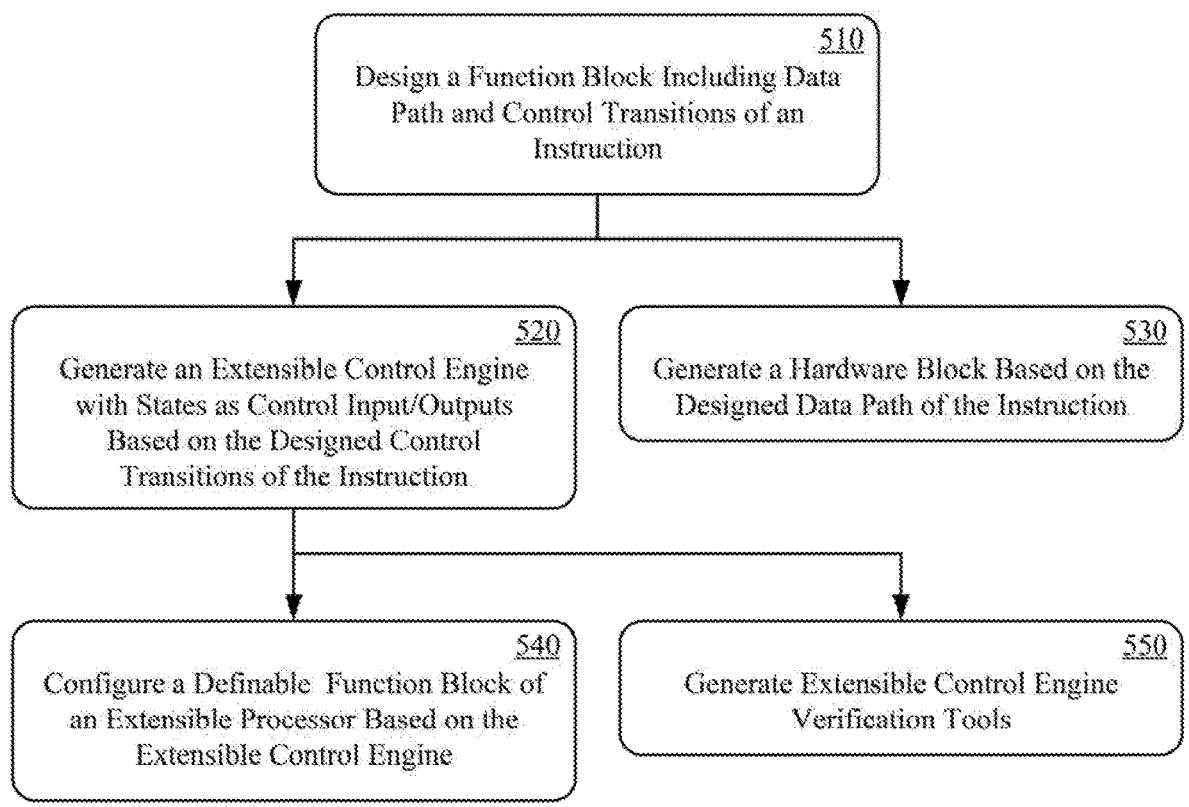
FIG. 5 shows a method of configuring an extensible processor, in accordance with aspects of the present technology.

Optionally, extensible control engine verification tools can be generated, at 340. In one implementation, extensible processor generator software, such as an integrated development environment (IDE) from the extensible processor vendor, provides the verification tools, including but not limited to, compiler, debugger, simulator, real time operating system, synthesizable register transfer language, electronic design automation, and test benches, Referring now to FIGS. 4 and 5, a computing device including an extensible processor and method of configuring the extensible processor, in accordance with other aspects of the present technology, is shown. The computing device 400 can be, but is not limited to, cloud computing platforms, edge computing devices, servers, workstations, personal computers (PCs). The extensible processor 410 can implement a central processing unit (CPU), graphics processing unit (GPU), general-purpose computing on graphics processing unit (GPGPU), internet of things (IOT) CPU, tensor processing unit (TPU), digital signal processor (DSP), or any other such processor. Again, the configuration method may be implemented as computing device-executable instructions (e.g., computer program) that are stored in one or more computing device-readable media (e.g., computer memory) and executed by one or more computing devices (e.g., processors). In one implementation, the configuration method can be implemented in an integrated development environment (IDE) fir the extensible processor 410.

Configuring the extensible processor 410 can include designing one or more function blocks including data path and control transitions of one or more instructions, at 510. At 520, one or more extensible control engines 430, 440 with control states as control inputs and outputs can be generated based on the control transitions of the one or more instructions. In one implementation, the control states of the extensible control engine 430, 440 can be coupled to core states of the extensible processor 410. The control state of extensible control engines 430, 440 can be coupled to the same core state or different core states depending upon the respective instruction. In one implementation, one instruction can serve as one finite state machine (FSM). In another implementation, a plurality of instructions can serve as a FSM, with each instruction serving as a corresponding state in the FSM.

At 530, one or more hardware blocks 450, 460 can be generated based on the data path for respective control engines 430, 440. The hardware blocks can also be further generated based on at least a portion of the control transitions for respective control engines 430, 440. In one implementation, the data path of the hardware block 450, 460 can be coupled to the respective extensible control engines 430, 440 of the extensible processor 400.

One or more extensible control engines with states as controls input and outputs can also be generated as described above with reference to FIGS. 2 and 3.

At 540, one or more definable function blocks of the extensible processor 410 can be configured based on the one or more generated extensible control engines 430, 440. In such an implementation, at least a portion of the control transitions is part of the respective extensible control engine 430, 440 within the extensible processor 410, while the data paths are implemented in the hardware blocks 450, 460 external to the extensible processor 410. Optionally, the hardware blocks 450, 460 can also include a portion of the control transitions.

In one implementation, the data path of the hardware blocks 450, 410 can be coupled by one or more queues 470-476, buffets or the like to the respective extensible control engines 430, 440. The queues, buffers or the like enable execution of blocks out of lockstep with the execution pipeline stages. In another implementation, the data path of the hardware block 450, 460 can be directly connected (not shown) to the respective extensible control engines 430, 440.

In one implementation, the control input and outputs of the extensible control engine 430, 440 can be implemented as architectural visible control states 480 of the extensible processor 410. In one implementation, the architectural visible control states 480 can be specific to a given extensible control engine 430. Architectural visible control states 480 can also be shared between extensible control engines 430, 440. In one implementation, data states can also be passed between the extensible processor 410 and an extensible control engine 430 by architectural visible control states 480. In another implementation, data states can be passed between multiple extensible control engines 430, 440 by architectural visible control states 480. In one implementation, an extensible control engine 430 is tied to a specific pipeline stage 426 of the extensible processor 410.

In one implementation, the extensible control engine 430 can execute every cycle once enabled. In one implementation, execution of a given extensible control engine 430 can be enabled and disabled via one or more architectural visible control states 480 of the extensible processor 410. For example, a control state can include one hit that indicates whether the extensible control engine 430 is enabled or disabled. In an optional implementation, a specified state can indicate that an instruction result of the extensible control engine 430 is ready. When the specified state indicates that the result is not ready, dependent instructions can be stalled. For example, a control state 480 can include two-bits, one bit can indicate whether the given extensible control engine 430 is enabled or disabled, and a second hit can indicate whether a result of the given extensible control engine 430 is ready or not. In one implementation, the instruction of the extensible control 430 does nut appear in a software instruction steam of the extensible processor 410. In one implementation, the extensible control engine 430 can be clock gated, which can reduce power consumption when the extensible control engine is not enabled.

One or more definable function blocks of the extensible processor 410 can also be configured based on one or more extensible control engines as described above with reference to FIGS. 2 and 3.

Optionally, extensible control engine verification tools can be generated, at 550. In one implementation, extensible processor generator software, such as an integrated development environment (IDE) from the extensible processor vendor, provides the verification tools, including but not limited to, compiler, debugger, simulator, real time operating system, synthesizable register transfer language, electronic design automation, and test benches.

Figure 6:
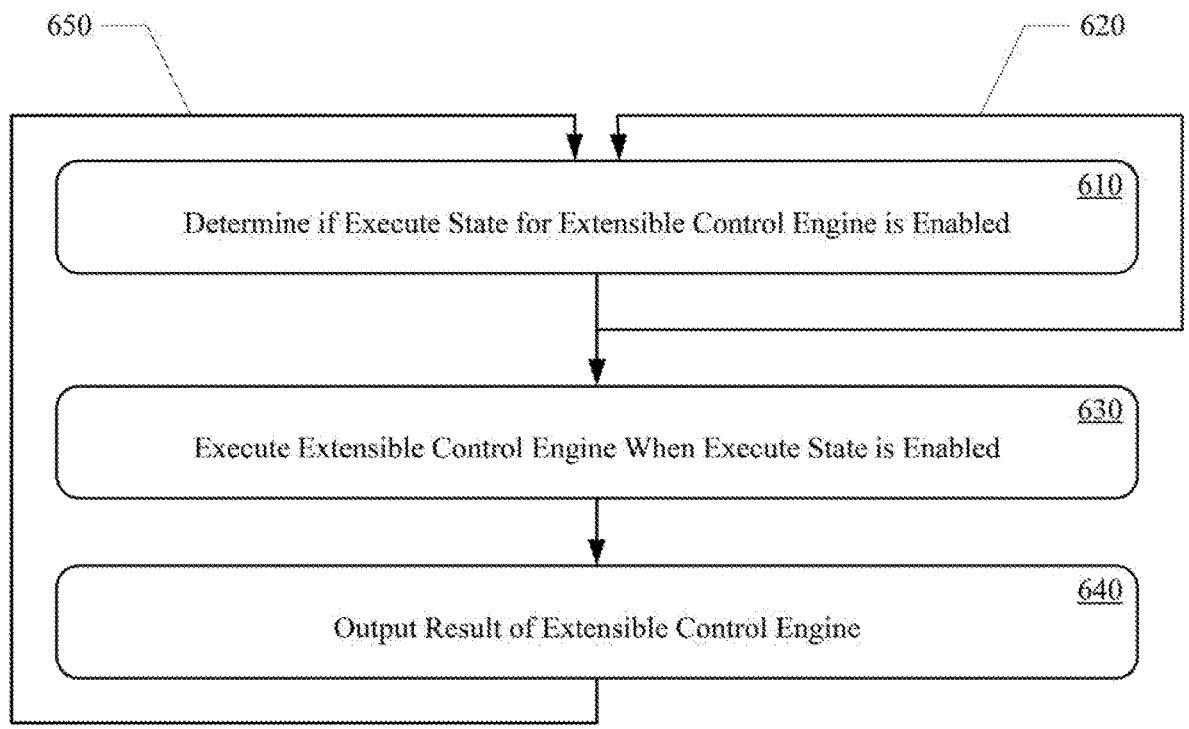
FIG. 6 shows a method of operation of an extensible processor, in accordance with aspects of the present technology.

Operation of the extensible processor will be further explained with reference to FIG. 6. Operation of the extensible processor 210, 410 includes numerous conventional aspects that are not germane to an understanding of aspects of the present technology, and therefore are not described herein. Instead, operation of the extensible processor 210, 410 as described herein will focus on the extensible control engines 230, 240, 430, 440. At 610, an execution state for an extensible control engine can be determined. In one implementation, the extensible control engine 230, 240, 430, 440 can be configured to read an architecturally visible control state 250, 480 to determine if execution of the extensible control engine 230, 240, 430 440 is enabled or disabled. For example, a control state 250, 480 can include one bit that indicates whether the corresponding extensible control engine 230, 240, 430, 440 is enabled or disabled. If the execution state for the extensible control engine is disabled, the process of determining if the execution state for the extensible control engine can be repeated at 620.

When the execution state is enabled, the extensible control engine can be executed, at 630. In one implementation, the extensible control engines 230, 240, 430, 440 are configured to perform single cycle repeated execution, which is tied to a specific processor pipeline stage 226, 426. In one implementation, execution of the extensible control engines 230, 240, 430, 440 are committed when enabled. In one implementation, saving and restoring the extensible processor state can be used to stop and restart the extensible control engines 230, 240, 430, 440 for context switching. At 640, a result of execution of the extensible control engine can be output. In one implementation the result can be passed from the extensible control engine 230, 240, 430, 440 to a specific execution pipeline stage 226, 426 through one or more architecturally visible control states 250, 480 of the extensible processor 210, 410. At 650, the process can be repeated. In one implementation, the extensible control engine 230, 240, 430, 440 can be reissued every cycle once enabled. Accordingly, a software instruction stream is not needed to initiate the instruction of the extensible control engine 230, 240, 430, 440.

Figure 7:
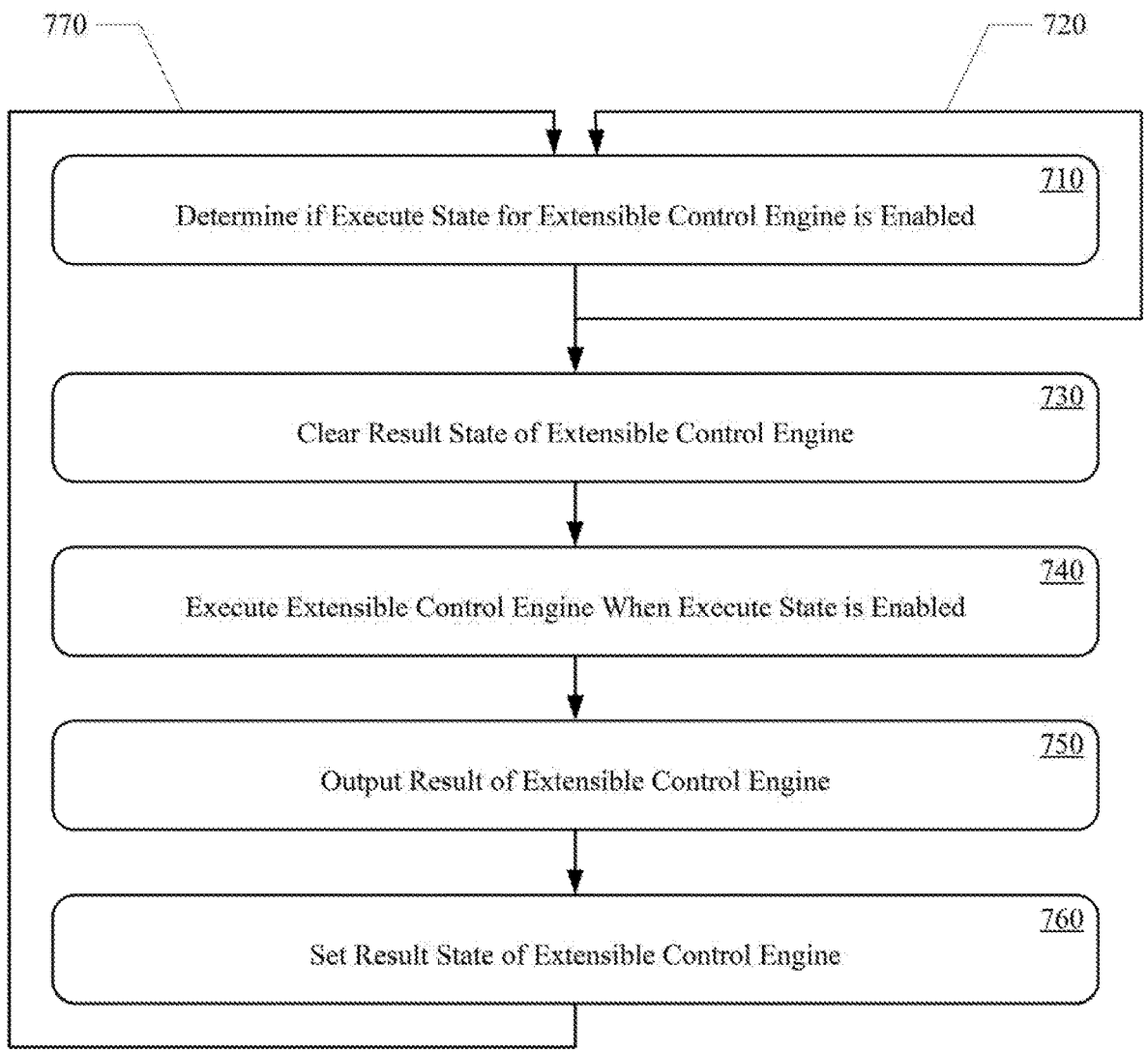
FIG. 7 shows a method of operation of an extensible processor, in accordance with aspects of the present technology.

Optionally, operation of the extensible processor can utilize blocking queue push/op interface for implementing control transitions, which can have lower power requirements than other control techniques. Referring now to FIG. 7, operation of the extensible processor, in accordance with other aspects of the present technology, is shown. Again, operation of the extensible processor 210, 410 includes numerous conventional aspects that are not germane to an understanding of aspects of the present technology, and therefore are not described herein. Instead, operation of the extensible processor 210, 410 as described herein will focus on the extensible control engines 230, 240, 430, 440.

Operation can include determining an execution state for an extensible control engine, at 710. In one implementation, the extensible control engine 230, 240, 430, 440 can be configured to read an architecturally visible control state 250, 480 to determine if execution of the extensible control engine 230, 240, 430, 440 is enabled or disabled. For example, a control state 250, 480 can include one bit that indicates whether the, corresponding extensible control engine 230, 240, 430, 440 is enabled, or disabled. If the execution state for the extensible control ermine is disabled, the process of determining if the execution state for the extensible control engine can be repeated at 720.

When the execution state is enabled, a result state of the extensible control engine can be cleared, at 730. At, 740, the extensible control engine can be executed. In one implementation, the extensible control engines 230, 240, 430, 440 are configured to perform single cycle repeated execution, which is tied to a specific processor pipeline stage 226, 426. In one implementation, execution of the extensible control engines 230, 240, 430, 440 are committed when enabled. In one implementation, saving and restoring the extensible processor state can be used to stop and restart the extensible control engines 230, 240, 430, 440 for context switching. At 750, a result of execution of the extensible control engine can be output. At 760, the result state of the extensible control engine can be set. For example, the control state 250, 480 can include a second bit that indicates whether a result of a corresponding extensible control engine 230, 240, 430, 440 is ready or not. In one implementation the result can be passed from the extensible control engine 230, 240, 430, 440 to a specific execution pipeline stage 226, 426 through one or more architecturally visible control states 250, 480 of the extensible processor 210, 410. The process can then be repeated, at 770. In one implementation, the extensible control engine 230, 240, 430, 440 can be reissued every cycle once enabled. Accordingly, a software instruction stream is not needed to initiate the instruction of the extensible control engine 230, 240, 430, 440.

Figure 8:
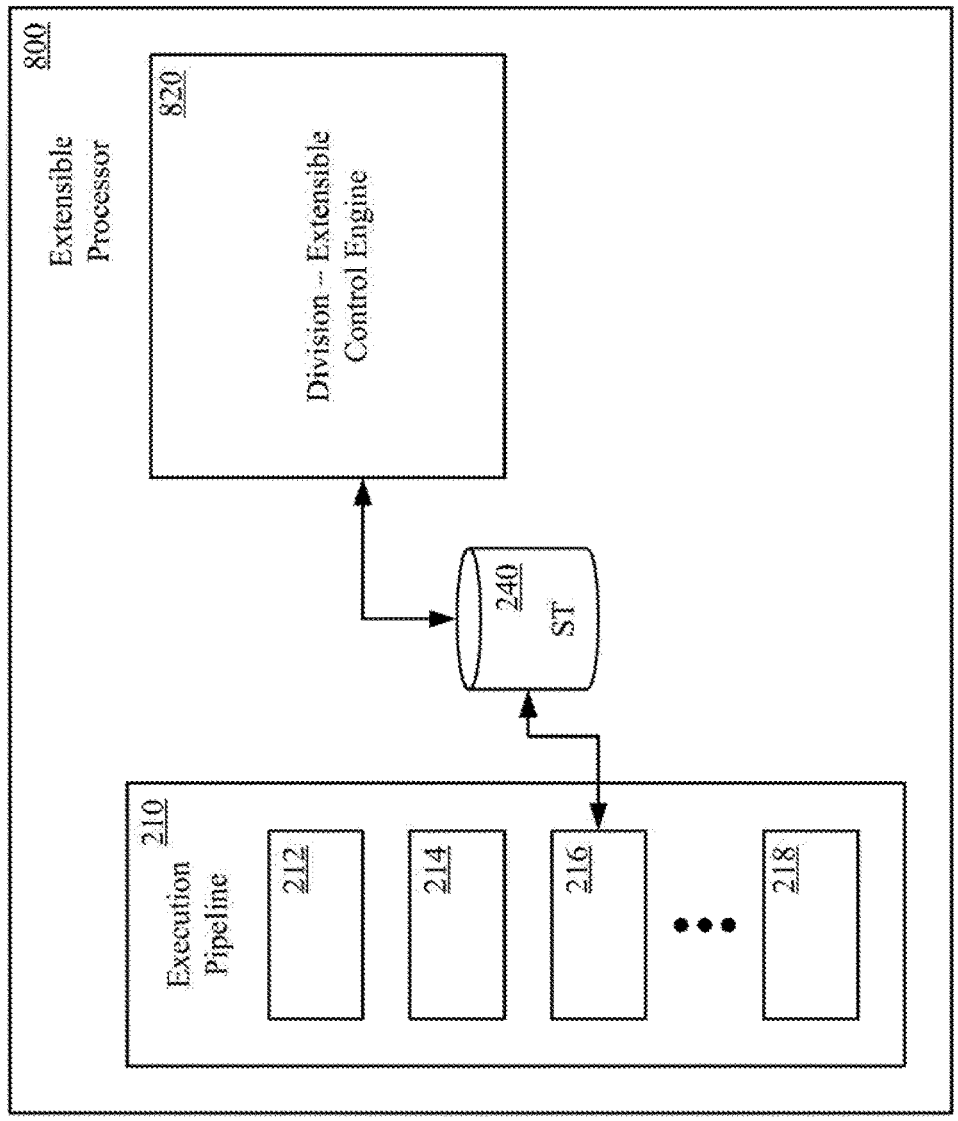
FIG. 8 shows an exemplary configured extensible processor, in accordance with aspects of the present technology.

Referring now to FIG. 8, an exemplary configured, extensible processor, in accordance with aspects of the present technology, is shown. The exemplar configured extensible processor 800 can include an extensible control engine 820 configured to implement a division function as shown in Table 1 ture states. The FSM div ready code can be used to indicate that the result is ready. The result operation (e.g., operation div_re) can provide the result as an output state.

Figure 9:
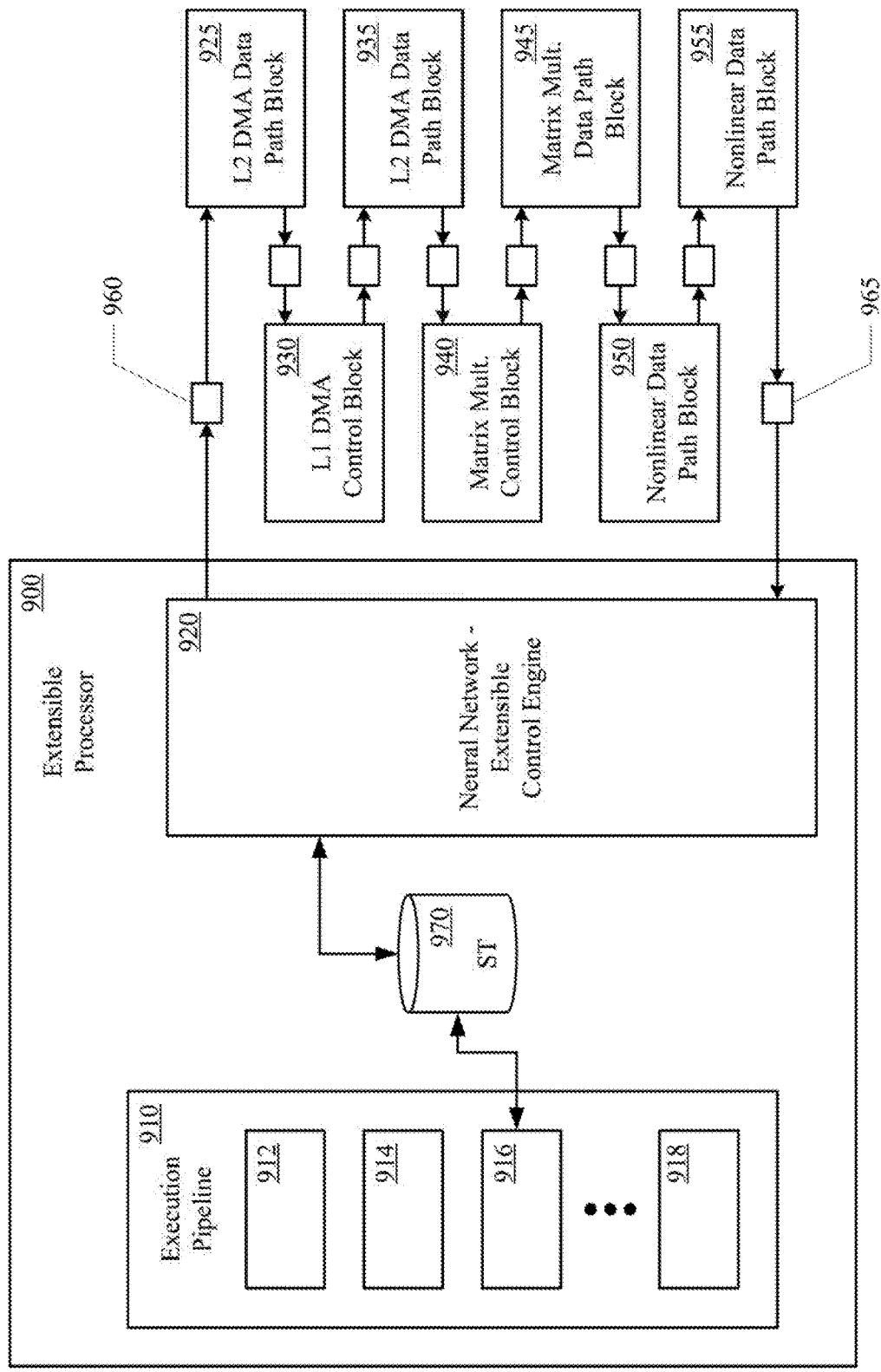
FIG. 9 shows an exemplary configured extensible processor, in accordance with aspects of the present technology.

Referring not to FIG. 9, an exemplary configured extensible processor, in accordance with aspects of the present technology, is shown. The exemplary configured extensible processor 900 can include an extensible control engine 920 and a plurality of external hardware blocks 925-955 configured to implement a neural network engine. The extensible control engine 920 can generate control state signals to initiate execution at each cycle. Control states can also be pass between the external hardware blocks 925-955 utilizing corresponding queues 960-965. The external hardware blocks 925-955 can move data to L2 cache, from L2 cache to L1 cache, execute matrix multiplication on the data, and apply an activation function, such as a rectified linear (ReLU) activation function, before outputting the result back, to a specific execution pipeline state 916.

In accordance with aspects of the present technology, defined function blocks can advantageously be automatically generated. Designers do not need to consider complicated control logic. Instead, designers can focus on the data path and control transitions of the extensible control engine. Control can advantageously be tightly coupled with core states of the extensible processor. Software tools can be automatically generated so that the extensible control engine configured definable function blocks can be readily verified.

TABLE 1

```
state dividend 32
state divisor 32
state temp 32
state result 32
state counter 5
state start 1
state ready 1
operation div { } {in start, in dividend, in divisor, inout temp, inout result, inout
counter, out ready} {
    wire first_cycle = start == 1'b1;
    wire [4:0] remain_num_cycles = first_cycle ? (calculate the number of cycles) :
counter − 1;
    assign counter = remain_num_cycles;
    wire last_cycle = remain_num_cycles == 0;
    assign ready = last_cycle ? 1'b1 : 1'b0;
    // compute one stage of divide
}
FSM div ready // relates div with ready, processor stalls
        // if ready is read but is low
operatian div_issue {in AR dividend_data, in AR divisor_data} {out start, out
dividend, out divisor} {
    assign dividend = dividend_data;
    assign divisor = divisor_data;
    assign start = 1'b1;
}
operation div_res {out AR result_data} {in result, in ready} {
    assign result data = result;
    assign result_data_kill = !ready;
}
C code:
div_issue(dividend, divisor);
...... // other code
result = div_res( );
```

The extensible control engine 820, with states as control input and outputs can be configured based on the data path and control transitions of the division function. The divide operation (e.g., operation div) can utilize a first set of empty braces to indicate that the instruction is not a software instruction. It is noted that non-software instructions have empty first braces. However, not all software instructions have non-empty first braces. A second set of braces can be utilized to specify control inputs and outputs with architec- The definable function blocks can advantageously be used to implement non-pipelined custom instructions.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing device including an extensible processor comprising:
   an execution pipeline;
   one or more extensible control engines;
   architectural visible control states coupled between the software execution pipeline and the one or more extensible control engines;
   wherein the extensible processor is configured to,
      determine a control state of the one or more extensible control engines from the architectural visible control states,
      initiate execution of a given one of the extensible control engines when a control state in the architectural visible control states corresponding to the given one of the extensible control engines is enabled, wherein the given one of the extensible control engines comprises control input and control outputs based on one or more control transitions of an instruction, and wherein the given one of the extensible control engines is executed each cycle when the control state in the architectural visible control states corresponding to the given one of the extensible control engines is enabled, and
      output a result of execution of the given one of the extensible control engines to the architectural visible control states.

2. The computing device including the extensible processor of claim 1, wherein the given one of extensible control engines includes one or more data paths of the instruction.

3. The computing device including the extensible processor of claim 1, further comprising:
   an external hardware block coupled to the given one of the extensible control engines, wherein the external hardware block includes one or more data paths of the instruction.

4. The computing device including the extensible processor of claim 1, wherein the given one of the extensible control engines is not initiated by a software instruction stream.

5. One or more non-transitory computing device readable media having instructions stored thereon that when executed by one or more processing units perform a method comprising:
   designing a definable function block, of an extensible processor, including one or more data paths and one or more control transitions of an instruction;
   generating an extensible control engine, of the extensible processor, with architectural visible control states as control inputs and control outputs based on the one or more control transitions and based on the one or more data paths, wherein the extensible control engine executes every cycle based on a specific state of the architectural visible control states; and
   configuring the definable function block of the extensible processor based on the extensible control engine.

6. The one or more non-transitory computing device readable media having instructions stored thereon that when executed by one or more processing units perform the method of claim 5, further comprising:
   generating a hardware block external to the extensible processor based on the one or more data paths.

7. The one or more non-transitory computing device readable media having instructions stored thereon that when executed by one or more processing units perform the method of claim 6, further comprising:
   generating a hardware block external to the extensible processor further based on the one or more control transitions.

8. The one or more non-transitory computing device readable media having instructions stored thereon that when executed by one or more processing units perform the method of claim 6, wherein the hardware block is coupled to the extensible control engine by one or more sets of queues.

9. The one or more non-transitory computing device readable media having instructions stored thereon that when executed by one or more processing units perform the method of claim 5, further comprising:
   generating one or more extensible control engine verification tools.

10. The one or more non-transitory computing device readable media having instructions stored thereon that when executed by one or more processing units perform the method of claim 5, wherein the control states are coupled to core states of the extensible processor.

11. The one or more non-transitory computing device readable media having instructions stored thereon that when executed by one or more processing units perform the method of claim 5, wherein the control states include an indication of whether the extensible control engine is enabled or disabled.

12. The one or more non-transitory computing device readable media having instructions stored thereon that when executed by one or more processing units perform the method of claim 5, wherein the control states include an indication of whether a result of the extensible control engine is ready.

13. A method of operation of an extensible processor comprising:
   determining a control state of an architecturally visible control state for an extensible control engine;
   executing the extensible control engine when the control state is enabled, wherein the extensible control engine comprises control inputs and control output based on or more control transitions of an instruction;
   outputting a result of execution of the extensible control engine; and
   setting a result state of the extensible control engine when outputting an execution result of the extensible control engine.

14. The method according to claim 13, wherein the extensible control engine includes one or more data paths of the instruction.

15. The method according to claim 13, further comprising:
   executing an external hardware block coupled to the extensible control engine, wherein the external hardware block includes one or more data paths of the instruction.

16. The method according to claim 13, wherein the extensible control engine is executed each cycle when the control state is enabled.

17. The method according to claim 16, wherein execution of the extensible control engine is committed for each cycle when the control state is enabled.

18. The method according to claim 13, wherein the instruction is not initiated by a software instruction stream.

19. The method according to claim 13, wherein the extensible control engine is not initiated by a software instruction stream.

20. The method according to claim 13, wherein executing the extensible control engine is tied to specific processor pipeline stage.

21. The one or more non-transitory computing device readable media having instructions stored thereon that when executed by one or more processing units perform the method of claim 5, wherein the extensible control engine executes every cycle based on a specific state of the architectural visible control states.

* * * * *